United States Patent
Dickson (10) Patent No.: US 11,482,074 B1
(45) Date of Patent: Oct. 25, 2022

(54) CRYPTOCURRENCY TRANSACTIONAL SYSTEMS AND METHODS

(71) Applicant: Matthew Dickson, Dallas, TX (US)

(72) Inventor: Matthew Dickson, Dallas, TX (US)

( * ) Notice: Subject to any disclaimer, the term of this patent is extended or adjusted under 35 U.S.C. 154(b) by 0 days.

(21) Appl. No.: 16/868,530

(22) Filed: May 6, 2020

Related U.S. Application Data (60) Provisional application No. 62/903,702, filed on Sep. 20, 2019, provisional application No. 62/844,115, filed on May 6, 2019.

(51) Int. Cl.

| | |
|---|---|
| *G07F 17/32* | (2006.01) |
| *G06Q 20/06* | (2012.01) |
| *G06Q 50/34* | (2012.01) |
| *G06Q 40/04* | (2012.01) |
| *G06Q 20/36* | (2012.01) |
| *G06Q 20/32* | (2012.01) |
| *G06Q 20/38* | (2012.01) |
| *G06Q 20/40* | (2012.01) |
| *H04L 9/30* | (2006.01) |
| *G06K 7/14* | (2006.01) |

(52) U.S. Cl.
CPC ....... *G07F 17/3244* (2013.01); *G06K 7/1413* (2013.01); *G06K 7/1417* (2013.01); *G06Q 20/0655* (2013.01); *G06Q 20/326* (2020.05); *G06Q 20/3672* (2013.01); *G06Q 20/3676* (2013.01); *G06Q 20/3678* (2013.01); *G06Q 20/3829* (2013.01); *G06Q 20/40145* (2013.01); *G06Q 40/04* (2013.01); *G06Q 50/34* (2013.01); *G07F 17/3225* (2013.01); *H04L 9/30* (2013.01); *G06Q 2220/00* (2013.01)

(58) Field of Classification Search
CPC ............ G07F 17/3244; G07F 17/3225; G06Q 2220/00
See application file for complete search history.

(56) References Cited

U.S. PATENT DOCUMENTS

| | | | |
|---|---|---|---|
| 2013/0065669 A1* | 3/2013 | Michaelson | G07F 17/3244 463/25 |
| 2015/0209678 A1* | 7/2015 | Edwards | A63F 13/792 463/25 |
| 2016/0012465 A1* | 1/2016 | Sharp | G06Q 20/321 705/14.17 |
| 2016/0358164 A1* | 12/2016 | Liao | G06Q 20/0655 |
| 2018/0043265 A1* | 2/2018 | Edwards | A63F 13/837 |
| 2018/0247191 A1* | 8/2018 | Katz | G06Q 20/065 |
| 2019/0165930 A1* | 5/2019 | Castinado | H04L 9/3239 |
| 2019/0180269 A1* | 6/2019 | Di Iorio | G06Q 20/354 |
| 2019/0180558 A1* | 6/2019 | Merati | G06Q 20/3678 |
| 2019/0299105 A1* | 10/2019 | Knight | G07F 17/3244 |
| 2019/0318348 A1* | 10/2019 | Brenner | G06Q 50/184 |
| 2019/0354963 A1* | 11/2019 | Di Iorio | G06Q 20/3678 |
| 2020/0076827 A1* | 3/2020 | Gluck | H04L 9/3239 |
| 2020/0152005 A1* | 5/2020 | Higgins | G06Q 20/065 |
| 2021/0086084 A1* | 3/2021 | Yi | A63F 13/35 |

* cited by examiner

*Primary Examiner* — Chase E Leichliter (74) *Attorney, Agent, or Firm* — Newman Law, LLC (57) ABSTRACT

A secure cryptocurrency transfer system between an electronic gaming machine and a cryptowallet.

2 Claims, 4 Drawing Sheets

CRYPTOCURRENCY TRANSACTIONAL SYSTEMS AND METHODS

BACKGROUND OF THE INVENTION

The proliferation of mobile devices with Internet capabilities (e.g., mobile phones, wearable devices) has made it increasingly easy for users to conduct electronic commerce and online purchases using merchant websites and mobile applications. This has also led to an increased shift away from paper-based monetary schemes (e.g., the exchange of physical or paper currency) to instead rely upon electronic systems for monetary exchange. Many electronic payment systems have been developed for exchanging money, including the use of electronic wallets and electronic funds transfer (EFT). EFT includes a direct debiting/crediting of a user's bank account at the instance of the user from a remote location.

In the context of gaming, such as casino gaming, ticketing systems and chips have replaced the use of physical currency for wagering purposes. Casino customers are not permitted to directly use credit cards and debit cards for gaming, such as by inserting credit cards in gaming machines, but rather trade money for credits or chips, either at a gaming table or at a gaming machine for example, which can then be redeemed as paper currency after play is completed.

Another type of electronic system for monetary exchange is commonly referred to as an electronic peer-to-peer payment system or digital currency system. Bitcoin is one example of a digital currency system that utilizes cryptographic techniques, and thus the digital currency is referred to as cryptocurrency. Although there are many such cryptocurrencies, Bitcoin (BTC) is one of the most well-known and thus will be discussed herein with reference to Bitcoin as encompassing other cryptocurrencies, as many other cryptocurrencies share similar features or derive from the same code base, such as Bitcoin Cash (BCH) and Bitcoin SV (BSV). Payments made using the Bitcoin system are recorded in a ledger (the "Block Chain", which is maintained in parallel by many different entities in the system) using its own unique monetary unit, which is also called a "bitcoin." The Bitcoin system has no central repository and no single administrator, and thus is viewed as a decentralized virtual currency.

One drawback of systems such as Bitcoin is that fraudsters and criminals may be able to rely upon the generally anonymous nature of the Bitcoin system to avoid detection. Thus, while a person engaging in transactions involving traditional payment forms, such as credit cards and US dollars is normally identifiable, bitcoins are anonymous and do not typically require any identification (other than a randomly generated key address) of the party currently owning such bitcoins.

Thus, there is a need for new and enhanced cryptocurrency payment systems and methods to create a digital currency system that has greater efficiency and more security.

SUMMARY OF THE INVENTION

The invention addresses and resolves the aforementioned issues, among other things.

DETAILED DESCRIPTION OF THE INVENTION

All references to documents contained herein, including any links, incorporates those documents in this application by reference as if copied herein.

For purposes of this description, the term "digital currency" may refer to units of value that may be used as a form of payment for transactions, including financial transactions involving gaming operations, such as transferring digital currency electronically to an electronic gaming machine, device, gaming devices, gaming terminal, fixed odds terminal, lottery machine, table game or electromechanical gaming device (collectively referred to as an "EGM" or electronic gaming machine herein), applying the digital currency to a player account created in memory on the electronic gaming machine in the form of credits for game play, initiating a game on the electronic gaming machine involving one or more wagers of credits, wherein the outcome of the game results in a loss of the wagered credits or a win in which an amount of credits are added to the credits in a player account.

Digital currency may be currency that is electronically generated by and stored within one or more devices, such as a user computing device, mobile device, a casino or central management system, or an electronic gaming machine. Digital currency may be purchased using conventional forms of currency (e.g., fiat currency) and generated with a specific value. Typically, the digital currency may not have a physical form of tender but may be accessible through a device such as those mentioned above using a software application such as a digital wallet or mobile application.

The term "cryptocurrency transactional system" may refer to one or more server computers that function to operate and maintain a cryptocurrency system. The cryptocurrency transactional system may function to facilitate the generation/issuance and distribution of digital currency between the one or more server computers within the cryptocurrency transactional system. The cryptocurrency transactional system may also function to enable the performance of transactions between the server computers for the transfer or wagers, credits, goods/services and/or the transfer of funds, for example, between a user's mobile device and an electronic gaming machine.

The term "node" may refer to a computing device within a cryptocurrency system. A node in a cryptocurrency system may be associated with and/or operated by a server computer of an operator or casino, or other provider. Each node may have particular rights and restrictions associated with the node. For example, an issuer node may have the right to generate and issue digital currency within a cryptocurrency payment network, while a distributor node may have the right to distribute digital currency, but not generate or issue digital currency. Other nodes in the cryptocurrency transactional system, such as operators, merchants and users (e.g., consumers or players), may have the right to transfer digital currency.

The term "key" may refer to a piece of data or information used for an algorithm. A key may be a unique piece of data and is typically part of a key pair where a first key (e.g., a private key) may be used to encrypt a message, while a second key (e.g., a public key) may be used to decrypt the encrypted message. The key may be a numeric or alphanumeric value and may be generated using an algorithm. A system server computer in a cryptocurrency transactional system of the invention may generate and assign a unique key pair for each node in the system. In some embodiments, a key may refer to either a node verification key pair or a transaction key pair.

A transaction key pair may include a transaction public key and a transaction private key. The transaction key pair may be used by the nodes and/or payment entities to conduct transactions in the cryptocurrency transactional system. The transaction key pair may be generated by a system server computer or may be generated by an operator server computer for a customer or player when a player account with the operator server computer is created. The transaction public key of a node may be distributed throughout the system in order to allow for authentication of payment transaction messages signed using the private key of the node.

A node verification key pair may include a node verification public key and a node verification private key. The node verification key pair may be used by the nodes and the system of the invention to verify that a node is an issuer node or a distributor node. The node verification key pair may be generated by a system server computer in response to a request message from a node to be designated an issuer node or a distributor node in the system. In other embodiments, the node verification key pair may be generated by a node (e.g., an operator server computer) and sent to the system server computer. In some embodiments, a node verification public key may be functionally similar to a transaction public key. However, the node verification public key may only be distributed to the node associated with the node verification public key. In such embodiments, the node verification public key may be encrypted prior to being sent to the appropriate node.

Embodiments of the invention may utilize one or more system server computers to determine and designate issuer nodes, which have the right to generate and issue digital currency, and distributor nodes, which have the right to distribute digital currency but not issue digital currency. Transactions performed through the cryptocurrency transactional system using the digital currency can be tracked and maintained in a ledger of transactions maintained by the issuer nodes and the distributor nodes.

Embodiments of the cryptocurrency transactional system of the invention are directed to various general and specific enhancements and improved security features such as those discussed herein. For example, a feature can be implemented to prevent "double spend" on a blockchain.

Feature 1—Preventing Double Spend on a Blockchain
Background And Definition of a Blockchain Transaction and Inputs and Outputs A transaction in the Bitcoin network describes the transfer of a specific amount of bitcoins from one account to another. Transactions are represented as signed data structures that are broadcast into the Bitcoin network and recorded by the nodes. It is comprised of references to one or more previous transactions that funded the spending party and an assignment of a specific amount of bitcoins to one or more addresses. A transaction is atomic in the sense that the claiming of bitcoins from the previous transactions is inseparably linked to the transfer of these bitcoins to the receiving account. The references to previous transactions are referred to as inputs to the transaction, whereas the account and the amount of bitcoins that it ought to receive are called outputs. After the transfer, the owner of the receiving account has new funds at her disposal to spend in future transactions. The balance of an account is the sum of the values of all unspent outputs owned by that account.

Double Spending with a Cryptocurrency

Double spending is the risk that a digital currency can be spent twice. Double-spending is a potential problem unique to digital currencies because digital information can be reproduced relatively easily. Physical currencies do not have this issue because they cannot be easily replicated, and the parties involved in a transaction can immediately verify the bona fides of the physical currency. With digital currency, there is a risk that the holder could make a copy of the digital token and send it to a merchant or another party while retaining the original.

More specifically, double spending a cryptocurrency is accomplished by creating two transactions and broadcasting those two transactions to different nodes on the network at the same time. Both transactions have exactly the same inputs but the transactions have separate outputs. The output of the first transaction typically sends the crypto to a wallet owned by the double spender. The second transaction output typically sends the output to the party the double spender wishes to fool. The double spender is hoping that the receiving party he wishes to fool sees the transaction as valid and the double spender receives something back of value before the miners notify the targeted party the transaction was invalid.

Standard Protection Against Double Spending

Bitcoin has a mechanism that verifies all of the transactions going into a block to verify that the same digital token isn't being spent in other transactions. More specifically, each transaction input is checked against the entire blockchain to ensure that the same input has NOT already been used in a different transaction. Bitcoin therefore only guarantees confirmation of a transaction once it has been accepted by the majority of participating nodes and hashed into the blockchain.

Even after the transaction has been in 1 block there is a chance that a transaction containing the fraudulent double spend could be propagating around more of the blockchain nodes than the initial transaction (for example the one sent to a merchant), so it is common for a merchant to wait for 4-6 blocks to be mined before trusting a payment, to verify that the transaction sent to their crypto wallet is valid and trusted. This can mean waiting for upwards of 1 hour before trusting the payment.

Prior Solutions

Three whitepapers for solutions to the double spending problem incorporated herein by reference include: "Have a Snack, Pay with Bitcoins"

Summary: the proposal does not fully prevent a double spend. It requires that a merchant's software connect to a large random sample of nodes in the Bitcoin network and follow other specific rules to make it harder for the attacker to successfully submit their fraudulent transaction and have it trump the valid transaction being used to pay the merchant; "Countering Double-Spend Attacks on Bitcoin Fast-Pay Transactions"

Summary: requires additional server software called "enhanced observers" to be running and to send alerts to the mining nodes. Requires updated blockchain node software that the miners must agree to run to react to these alerts; and "Double-spending Prevention for Bitcoin zero-confirmation transactions"

Summary: requires changes to the Bitcoin protocol which would require all of the miners of that blockchain to agree to the change to update their blockchain node software https://eprint.iacr.org/2017/394.pdf Drawbacks with Existing Solutions The "out of the box" solution for most blockchains as mentioned above in the "Standard Protection Against Double Spending" section requires waiting for multiple transactions to be mined into a block. On average it takes a block 10 minutes to be mined, though the variance can be very high, ranging from ~1 second to 2 hours.

The inventors mentioned drawbacks for each of the whitepaper solutions in the above section. There are likely several other double spend solutions out there that I haven't found. Most of the solutions that we have seen discussed on the internet require waiting for some period of time before considering a transaction as being valid (however these solutions do not required waiting for a transaction to get mined into a block). The solutions require waiting for the transaction to propagate around to multiple Bitcoin nodes in the mempool, which is essentially an in-memory list of transactions waiting to be put into blocks. The longer that you wait, the more secure a transaction is because it is being propagated to other nodes globally, and each mining node will ignore a transaction if it detects that the same input is being used for some other transaction.

Note: when you see reference to "zero confirmations" that means being able to consider a transaction valid once it reaches the Bitcoin nodes mempool, before the time it takes to actually mine it into a block.

Further Definition of the Bitcoin Mempool

Transactions are broadcast to nodes on the Bitcoin network. The transaction typically reaches the node that is closest to the sender and is included in a list of unconfirmed transactions called the mempool. Miners have the ability to include transactions in new blocks they are mining or to leave these transactions in the mempool. Typically transactions with higher included fees will be included first. Transactions with very low included fees can persist in the mempool and may not be processed for days or weeks. There are multiple ways that a transaction leaves the mempool on a Bitcoin node:

1. The transaction was included in a block
2. The transaction or one of its unconfirmed ancestors conflicts with a transaction that was included in a block
3. The transaction was replaced by a newer version (this is the "replace by fee" feature is is only relevant to BTC)
4. The transaction expired by timeout Exemplary Solutions Provided by the Invention Embodiments of the invention provide a solution that guarantees the prevention of a double spend instantaneously. The exemplary embodiments discussed herein involve the placement of a bet in gaming, but that is just one application of the invention.

Figure 1A:
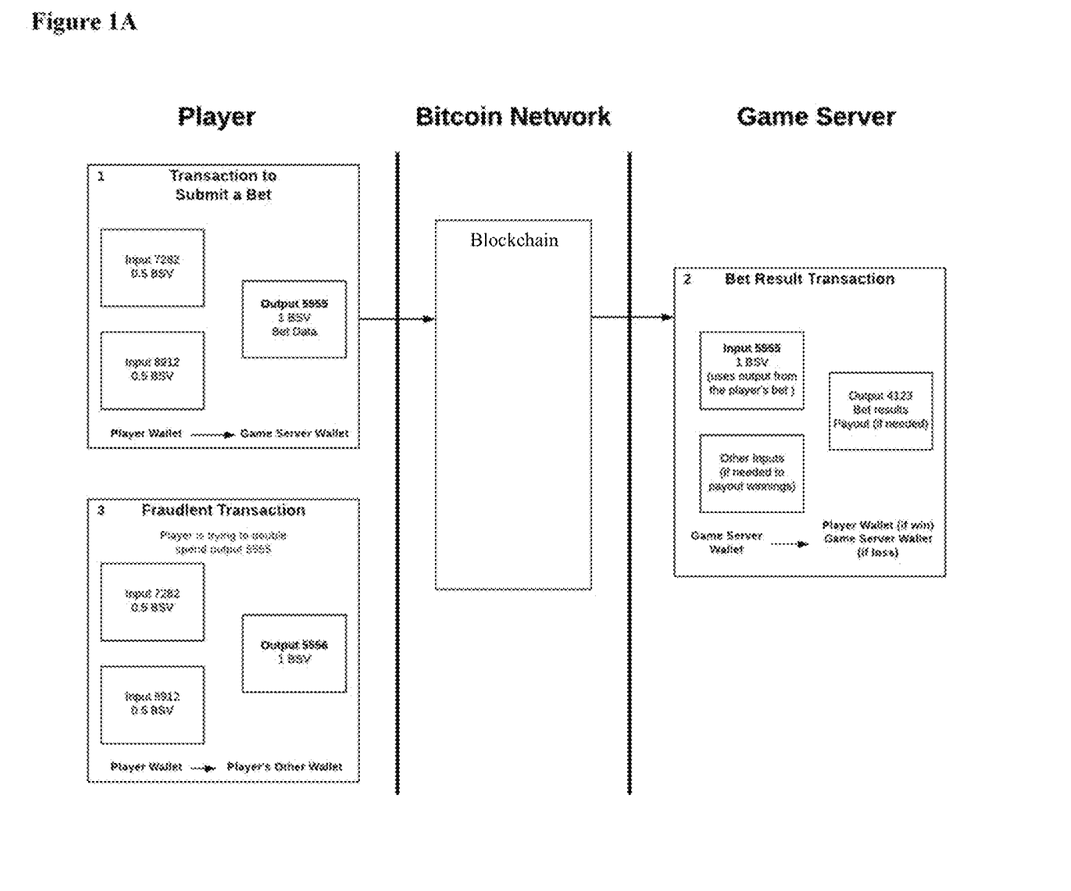
FIGS. 1A and 1B provide flow charts illustrating player bet transactions, wherein a player sends a fraudulent transaction.
Figure 1B:
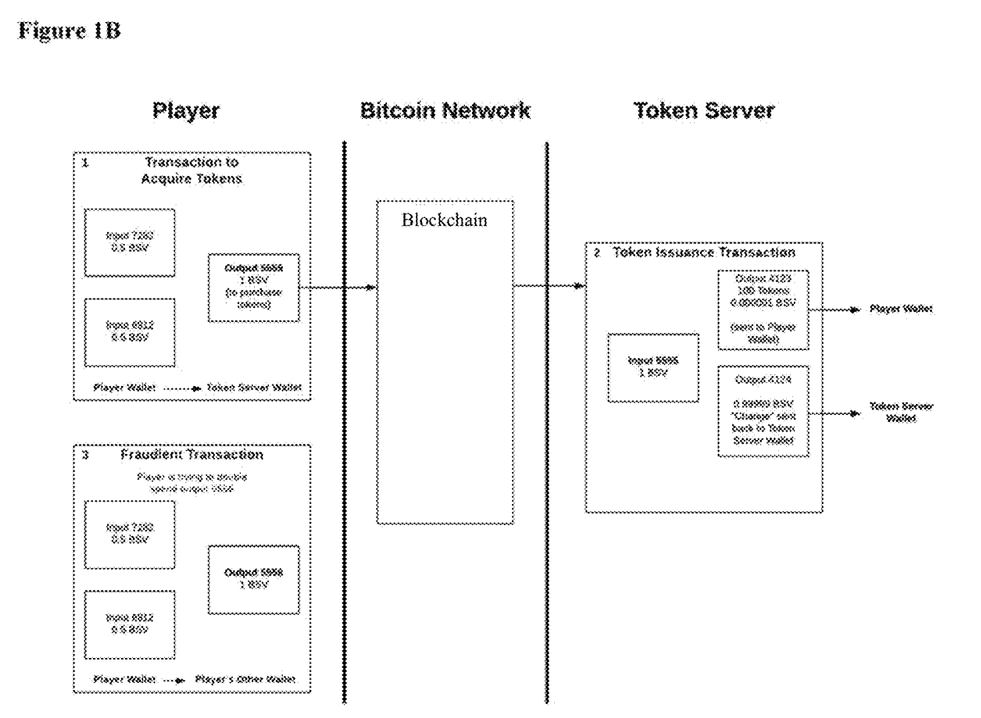

Referring to FIG. 1, which shows the various transactions that are involved in the gaming use case to place a bet, process the bet, and return the bet results and any winnings back to the player.

Transaction #1 is the player submitting a bet. Note that input 7282 for 0.5 BSV is combined with another input 8912, also for 0.5 BSV. These inputs originate from 2 unspent outputs from prior transactions that the player's wallet has received. These two inputs total 1 BSV, which is the amount that the player wants to bet. The two inputs are combined into a new single output 5555 to send to the blockchain. This new output also contains the data for what specific bet the player is making. It's important to note why we have 2 input. The blockchain is a simple ledger without the power or logic to compute values. Hence there is no way the chain itself can add input 7282 (0.5 BSV) and input 8912 (0.5 BSV) together. The sender has to include both input balances in a transaction to create output 5555 (1.0 BSV).

The Game Server sees this bet transaction show up in the blockchain mempool and immediately processes it and determines if the player has won or lost the bet. This transaction uses the players bet output 5555 as a new input to send the player the bet results and payout (if the player won the bet). There may be other inputs included, especially if the player has won, since the player will get payouts in excess of whatever amount was bet. The player wallet and gaming app then sees this new blockchain transaction and shows the win or loss results in the game.

Transaction #3 is the player's fraudulent transaction during their double spend attack. The player is attempting to place a bet (and win) with the casino and at the same time is also sending that same 1 BSV cryptocurrency back to themselves, for example to another wallet address that they own. The important thing to note here is that the player is trying to use the same inputs 7282 and 8912 to send a total of 1 BSV.

The blockchain nodes are eventually going to determine that either Transaction 1 or Transaction 3 is valid, but not both, since both transactions are using the same inputs. Exemplary unique features of the invention include using the players bet output (5555) as input when responding back to the player. This ensures that if the player were to attempt a double spend to send himself back the same crypto used to place the bet (i.e. reusing inputs 7282 and 8912), and the fraudulent transaction (#4) were to be the one accepted by the blockchain, then the bet transaction wouldn't be accepted by the miners.

This is because the miners would analyze the transaction's chain of outputs back to their associated inputs, back to their associated outputs, and so on, all the way back as far as that chain goes. It would be determined that one or more of the inputs were already used in another transaction. The miners would then drop the transaction from the mempool.

Subsequently the bet result transaction would also be seen as an invalid transaction and ignored by the miners. The player would not receive any payout. This prevents a double spend attack from being beneficial to the attacker/player and avoids any loss of revenue by the casino.

Other Uses Cases Other than Placing a Bet

Buying a token with the blockchain's native currency.

For example we intend to use the Tokenized protocol as a way to create tokens on the Bitcoin SV blockchain. Tokens are similar to a casino chip in gaming. We can pin a token to a fiat currency to protect the casino from native cryptocurrency fluctuation, like the price in USD rising and falling for 1 BSV.

The Double Spend feature of the invention protects us for this use case in the same way as placing a bet. Assume that a user tries to purchase tokens from us or one of our casino partners and they attempt to double spend the BSV they send us and the fraudulent transaction is the one accepted by the Bitcoin network. For that case the tokens that they received from us will become invalid as soon as the miners invalidate the transaction that the user created to purchase our tokens. The transaction will be invalid because the player's output is used as an input in the transaction to send the user tokens. The transaction will be invalid because the player's output is used as an input in the transaction to send the user tokens as shown in the diagram below. The output of BSV to the player is 0.000001 BSV. It should be understood that this is an example, as the exact amount can be any negligible amount (that is, what is referred to as a "dust" transaction, which is so small to not matter financially but sufficient for miners to detect an issue).

Exemplary Use Case-BSV

BTC has a "replace by fee" feature (RBF) that allows an unconfirmed transaction to be replaced with another transaction that has a higher fee, and miners will prioritize transactions that have higher fees. Transactions can be marked as non-RBF, but then there's also the risk of transactions not being confirmed for days or weeks.

All three forks (BTC, BSV, BCH) also have the drawback in that there is a maximum of 25 (or 50, just for BSV) chained unconfirmed transactions. There is a plan to remove this limit in BSV; we're not sure about BCH or BTC. Until this restriction is removed for a particular blockchain, at times we may not be able to use our solution on that blockchain (set the players bet output transaction as an input to the bet response transaction) because it's already been chained too many times. It should be understood that twenty-five bets equals fifty transactions because if a bet involves a response from the casino.

The player could attempt the double spend after he receives a loss response in an attempt to undo the bet. However since this requires the bet to propagate through the network sufficiently for the game server to have received it and for the response to also have been sufficiently propagated for the player to have seen it, it should be too late to successfully submit the double spend transaction.

BSV Transaction Example

Figure 2:
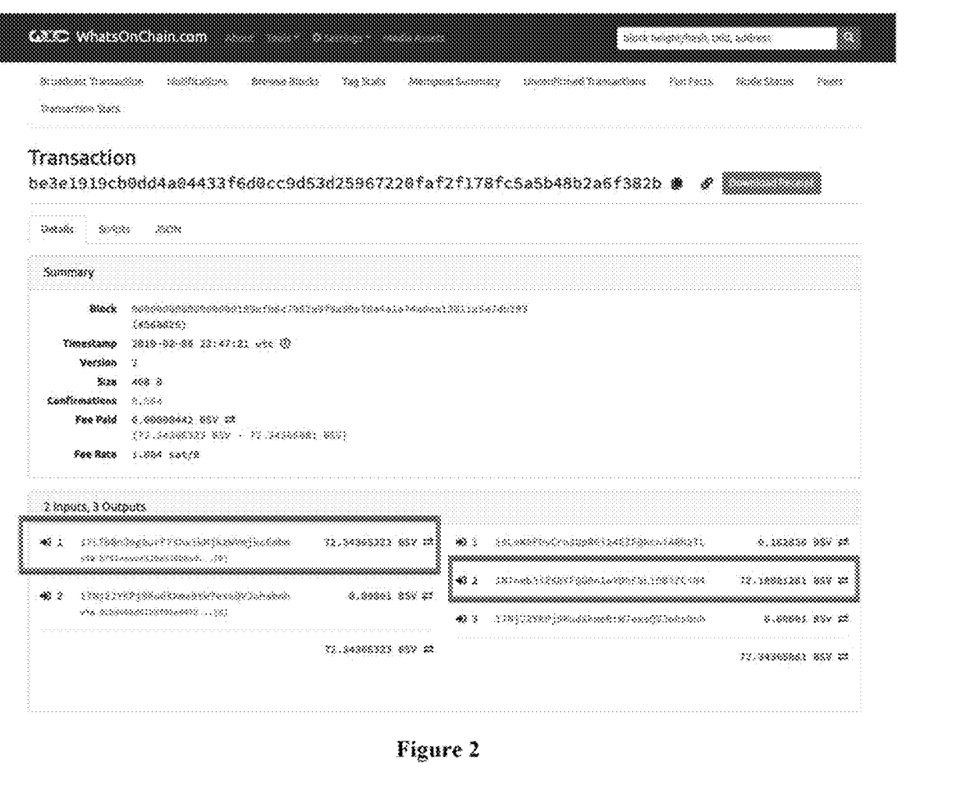
FIG. 2 is a printout showing an exemplary BSV transaction.

The following real BSV transaction is a good visual on how inputs and outputs are used for sending someone crypto, see FIG. 2 for example.

The wallet sending crypto only has a large input of 72.34 BSV to use to send someone 0.162836 BSV. The large input is used, and the specific amount being sent to the other party is the first output, and the second output is the change that gets returned back to the sender's wallet.

Another feature of the system of the invention relates to paying Blockchain transaction fees as discussed below.

Feature #2: Paying Blockchain Transaction Fees on Behalf of the Player

Embodiments of the invention can be configured to pay the BSV mining fees for the players gambling on using the transactional system.

The flow would look like this:
1. The player requests for and receives an output from chain-server sufficient to pay for the transaction.
2. The player adds his own outputs to create the transaction. The player signs the transaction with his private key and sends it back to the chain-server.
3. The chain-server adds a signature for the original output with its private key and sends the transaction to the blockchain.

Another feature of the system of the invention relates to including bet data in a public blockchain transaction as discussed below.

The system will include game servers, for example a Baccarat game server that will monitor for new transactions being added to the blockchain. It will recognize transactions that are being sent to the game server's address and that there is bet data within the transaction. The game server will read the bet data and then produce RNG and determine if the bet is won or lost. It will then create a new transaction with bet results and any payout for the user and submit to the blockchain. The bet data will be thus added to a public blockchain.

Figure 3:
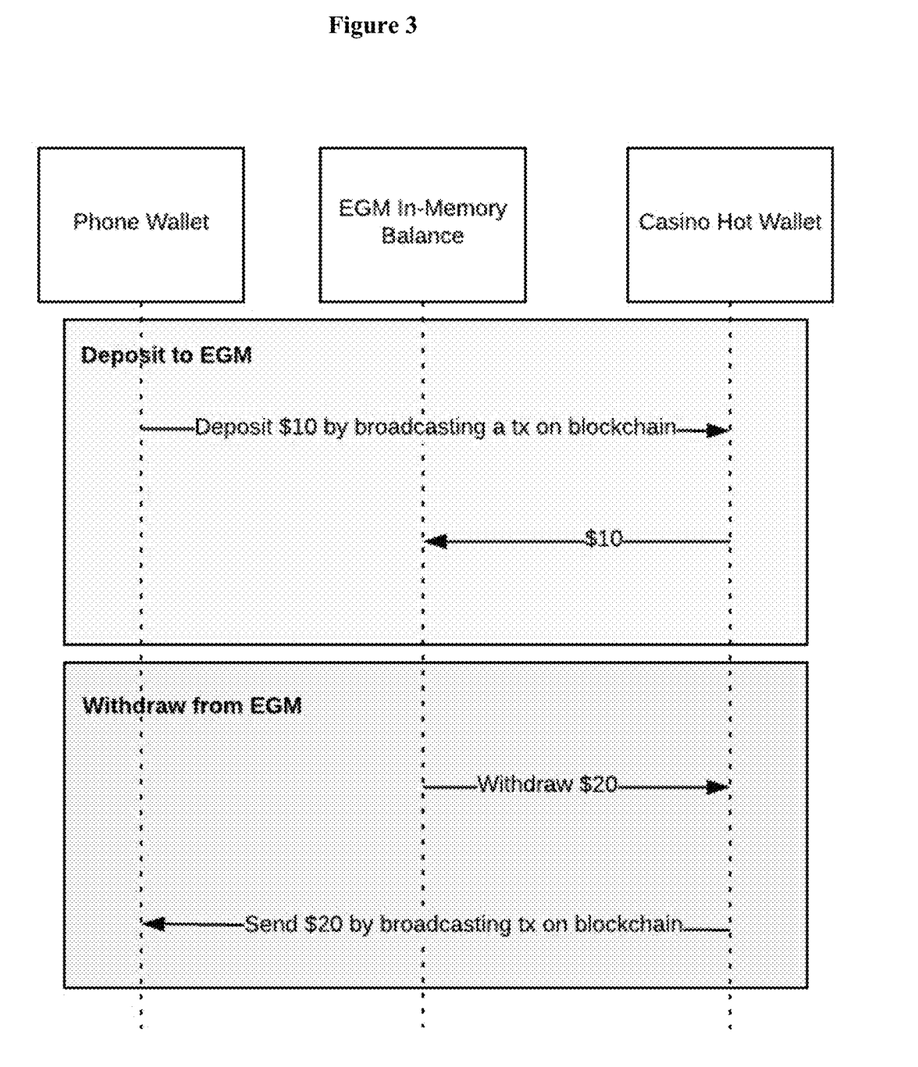
FIG. 3 provides a high level flow chart illustrating movement of funds.

Another feature of the system of the invention relates to connecting a crypto wallet to a player loyalty account as discussed herein and as depicted in FIG. 3. While the invention is discussed in connection gaming machines, it should be understood that the invention includes systems and methods for routing cryptocurrency in transactions at other platforms, including tables games, kiosks and terminals. For example, a device may be installed at a table game wherein the device receives cryptocurrency which is then converted to gaming chips. A dealer or casino staff may print a receipt of the transaction which can be used for accounting and reconciliation purposes, that is, the receipt shows the table as having received an amount in cryptocurrency in the same way fiat currency is collected.

A player can connect the cryptocurrency wallet of the invention to their casino player loyalty account and then send and remove credits from an electronic game machine (EGM) or other platforms. Although other actions are anticipated, this is primarily about moving crypto to/from an EGM.

Solution

Player downloads our crypto wallet to phone. Wallet is typical crypto type that uses public key encryption. The Player generates a public/private key pair.

Player associates the public key of their crypto wallet with their unique player loyalty ID in the operator or solution provider mobile app. The Casino could also make this association using their software. In either case the end result is that there is an association of player loyalty ID and player cryptocurrency wallet public key in the casino's backend database.

Player inserts loyalty card into EGM and the EGM ID is then associated to the player loyalty ID (and player public key) in the backend database. The EGM could also have a QR or barcode scanner that would scan a player's wallet's public key. The key could be represented with a QR code or barcode displayed on a mobile device, or alternatively, Bluetooth, NFC or facial recognition could be used.

Casino backend notifies the player wallet which EGM the player is located at

Player opens mobile app and is able to select deposit or withdraw from within the app This player to EGM association or mapping may be stored on a server or blockchain.

Exemplary Deposit to EGM Flow
1. Player chooses the amount of credits they'd like to deposit in the app and clicks the send button
2. At this point the wallet creates a transaction and digitally signs it with the private key. The recipient of the transaction is the casino that owns the EGM.
3. Transaction is broadcast to the blockchain and casino wallet receives the credits
4. Note that the transaction includes the public key of the sender. The casino therefore matches the sender's public key to the player loyalty ID.
5. The casino backend identifies the EGM that the player is located at by looking up the EGM ID from the public key value of the wallet that made the withdraw request.
6. Casino backend send amount of credits received to that particular EGM that the player is sitting at (for example via a SAS protocol network call)
7. The balance is updated on the EGM Exemplary Withdraw from EGM Flow
1. Player uses the mobile app and chooses the amount of credits to cash out of the EGM that they are currently playing at. It can be all or just a portion of the current credits balance at the EGM, meaning that the player could leave some credits on the EGM and cash those credits out with a ticket if so desired.
2. Player wallet creates and signs a transactions to request an amount of credits to withdraw. This transaction is a dust transaction with the minimum amount of crypt needed to have the blockchain accept the transaction. That transaction is broadcast to the blockchain. A service running with the casino datacenter is watching the blockchain. It then identifies the comman sent to its public key. The blockchain is used as a messaging bus to send commands to other components in the system.
3. After receiving the withdrawal request, the casino service identifies the EGM that the player is located at by looking up the EGM ID from the public key value of the wallet that made the withdraw request.
4. The casino service then communicates or "calls" the software of the invention running on the EGM that the player is located at to invoke the withdraw action (for example via a SAS protocol network call)
5. The casino service creates and signs a transaction to send credits from the casino hot wallet to the player's wallet. This transaction is sent to the blockchain.
6. Player receives credits on the mobile wallet, removes player card and walks away In some embodiments, the casino backend or central management system is actively maintaining a mapping of each loyalty card and the EGM that it's inserted into.

In some embodiments, the invention replaces the player loyalty card with a crypto wallet public key as the player ID. In some embodiments, an additional piece of hardware is installed or repurposed on the EGM to be able to securely read the public key of the customer's mobile device. For example, in some embodiments an EGM card reader is replaced with a QR/bar code scanner. The scanner is able to securely read a QR code displayed by the crypto wallet via the mobile device display to establish a link the EGM to the customer's public key of his crypto wallet. In other embodiments, the association of crypto wallet to EGM is created via one or more of a QR code on the display device of the EGM, Bluetooth beacons, entering a code or password into the EGM, or identifying the EGM in the wallet through the customer's mobile device, or through NFC tags on the EGM used to identify the EGM.

The various participants and elements described herein may operate one or more computer apparatuses to facilitate the functions described herein. Any of the elements in the figures, including any servers or databases, may use any suitable number of subsystems to facilitate the functions described herein.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Those skilled in the art will appreciate that the types of software and hardware used are not vital to the full implementation of the methods of the invention. The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Additional information regarding exemplary embodiments of the invention is provided below.

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™ and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

General Information Relating to Various Embodiments of the Invention

A controller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming machine of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

Those skilled in the art will readily appreciate that the apparatus described herein may include various computer and network related software and hardware, such as programs, operating systems, memory storage devices, data input/output devices, data processors, servers with links to data communication systems, wireless or otherwise, and data transceiving terminals. Those skilled in the art will further appreciate that the precise types of software and hardware used are not vital to the full implementation of the apparatus of the invention so long as it performs as described in at least one of the embodiments herein.

While exemplary apparatus, systems and methods of the invention have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth herein, in the claims and any equivalents thereto.

The invention claimed is:

1. A system for enabling secure cryptocurrency transfers between an electronic gaming machine and a cryptowallet, the system comprising:
   a) memory residing in the electronic gaming machine configured to store an amount of credit, the credit being usable to actuate play of a game on the electronic gaming machine;
   b) a server in communication with the electronic gaming machine and a blockchain memory pool, the server being configured to detect a cryptocurrency transaction being defined by a transaction data communicated by the cryptowallet to a blockchain memory pool, the transaction data comprising an amount of a cryptocurrency involved in the cryptocurrency transaction, an input identification associated with the cryptocurrency involved in the cryptocurrency transaction, an output identification associated with the cryptocurrency, and a user transaction public key, wherein responsive to detecting the transaction data, the server being further configured to compare a stored user transaction public key with the user transaction public key included in the transaction data, and communicate a signal to the electronic gaming machine to add an amount of credit to the credit stored in the memory residing in the electronic gaming machine memory responsive to the stored user transaction public key matching the user transaction public key, wherein the amount of credit corresponding to the amount of cryptocurrency involved in the cryptocurrency transaction.

2. The system as recited in claim 1 wherein the server is further configured to use the output identification associated with the cryptocurrency as a subsequent input identification in a subsequent cryptocurrency transaction involving the cryptocurrency.

* * * * *